June 6, 1939. G. H. TOMLINSON ET AL 2,161,110
METHOD OF AND APPARATUS FOR BURNING WASTE LIQUOR
Filed May 16, 1935 6 Sheets-Sheet 1

INVENTORS
George H. Tomlinson
Leslie S. Wilcoxson
BY

ATTORNEY.

June 6, 1939.   G. H. TOMLINSON ET AL   2,161,110
METHOD OF AND APPARATUS FOR BURNING WASTE LIQUOR
Filed May 16, 1935   6 Sheets-Sheet 4

INVENTORS
George H. Tomlinson
Leslie S. Wilcoxson
BY
ATTORNEY.

Patented June 6, 1939

2,161,110

UNITED STATES PATENT OFFICE 2,161,110

METHOD OF AND APPARATUS FOR BURNING WASTE LIQUOR

George H. Tomlinson, Westmount, Quebec, Canada, and Leslie S. Wilcoxson, Ridgewood, N. J.; said Leslie S. Wilcoxson assignor to The Babcock & Wilcox Company, Newark, N. J., a corporation of New Jersey Application May 16, 1935, Serial No. 21,836

28 Claims. (Cl. 23—48)

The present invention relates in general to the recovery of chemicals and/or heat from waste liquors containing inorganic chemicals and combustible organic matter, and more particularly, to the recovery of chemicals and heat from the pulp digestor residual liquor in the sulphate and soda processes of manufacturing paper pulp.

The present invention is directed to certain improvements in the process of and apparatus for recovering chemicals and heat from liquor of the character described, disclosed and claimed in Patent #2,070,632 of said Tomlinson.

The main object of the present invention is the provision of a self-sustaining process of recovering chemicals and heat from liquor of the character described which is characterized by an increase in the amount of liquor treated per sq. ft. of furnace cross-sectional area per day, a higher percentage of recovery of the chemicals and heat in the liquor treated, greater ease of and more effective control of the recovery operations, and the maintenance of more uniform and stable operating conditions, than with the process disclosed in said prior application. A further object is the provision of improved apparatus for carrying out our improved process which is characterized by the high liquor treating capacity, relatively low cost of maintenance and operation, and ease of control and repair of the recovery furnace; high steam generating capacity of the pressure parts at relatively low cost; and effective provisions for recovering heat and chemicals in the products of combustion from the steam boiler.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described preferred embodiments of our invention.

In view of the especial applicability of our invention to the paper pulp industry, our improved process will be specifically described as employed for the recovery of chemicals and heat from the residual or "black" liquor of pulp digestors used in the kraft or sulphate process. In this process, the weak black liquor from the digestors and washers ordinarily contains from 85%–90% moisture and 10%–15% solids. The chemical content of the weak black liquor is mainly sodium carbonate ($Na_2CO_3$) and sodium sulphate ($Na_2SO_4$) together with traces of sodium sulphide ($Na_2S$) and other salts in various complex combinations with the ligneous matter. During the recovery process the sulphates are reduced as much as possible to sodium sulphide ($Na_2S$) in accordance with general formula $$Na_2SO_4 + 4C = Na_2S + 4CO$$

The heat value of the weak black liquor is due to the presence of organic combustible matter or lignins released from the wood in the digestors.

In acordance with our process the weak black liquor from the digestor pulp is delivered to an evaporating device in which it is brought into intimate contact with the products of combustion from a recovery furnace and associated heat transfer apparatus, preferably in such a way that any chemicals suspended in the hot gases will be washed out by the weak liquor and eventually returned to the recovery furnace. The weak liquor absorbs a substantial amount of sensible heat of the hot gases, causing the evaporation of a large amount of its water content. The weak black liquor with the chemicals washed out or otherwise separated in the evaporating device is then subjected to further evaporation until it is concentrated to a density of preferably at least 50% solids.

The concentrated liquor at the desired viscosity and density is then delivered under pressure to a vertical recovery furnace, through which normally ascends a stream of high temperature gases produced by the burning of previously treated black liquor. The black liquor is preferably introduced into the upper section of the recovery furnace in the form of one or more relatively flat diverging streams of coarse spray particles directed across substantially the entire cross-sectional area of the furnace in intimate contact with the ascending stream of high temperature gases. The spray particles produced are advantageously of sufficient size and at sufficient velocity that they will not burn during transit but are dried sufficiently to be in a sticky condition when impacting on the furnace walls towards which they are directed. The particles tend to coalesce on the walls in the form of an adhering mass which builds out into the furnace. If the spray particles produced are too fine in size they tend to be burned in transit and carried by the ascending gas stream out of the furnace, causing a loss of chemicals and excessive deposits in the associated heat recovery device. The coalesced masses of sprayed material on the walls are in position to receive heat by radiation from the furnace bed and to contact by the ascending high temperature gases, causing the gradual evaporation of most of the remaining moisture and the distillation of some of the low temperature volatiles, whereby the deposited material assumes a porous character. The material on the walls contains substantially all of its original organic content and for convenience is hereinafter referred to as the "char". Each portion of the char continues to adhere to the wall or surrounding mass until the gravity effect thereon is sufficient to overcome the forces of adhesion or cohesion, whereupon it breaks off in lumps of various size falling into the lower section of the furnace and collecting on the hearth therein.

To insure the delivery of the char to the hearth in a substantially dry porous condition with substantially no change in its original organic content and also to substantially increase the liquor treating capacity of the furnace, the spray particles are discharged so as to be distributed in successive thin layers over an extended wall area. Our preferred method of effecting this result in a rectangular furnace is by locating the spray means adjacent an end wall and oscillating the same both vertically and about its axis of discharge to continuously impact on the remaining walls over a varying area. The vertical oscillations alone would cause the flat spray to be deposited on the opposing wall over a substantially rectangular area and over a substantially triangular area on the adjacent side walls. By the simultaneous oscillation about the spray axis, the side walls also will receive spray particles impacting over a substantially rectangular area. With this method of introducing the black liquor into the furnace the char on one portion of the walls will be directly exposed to contact by the furnace gases and furnace radiation, while the spray particles are impacting on another wall portion. The char will be thus dried in layers over an extended wall area.

Figure 2:
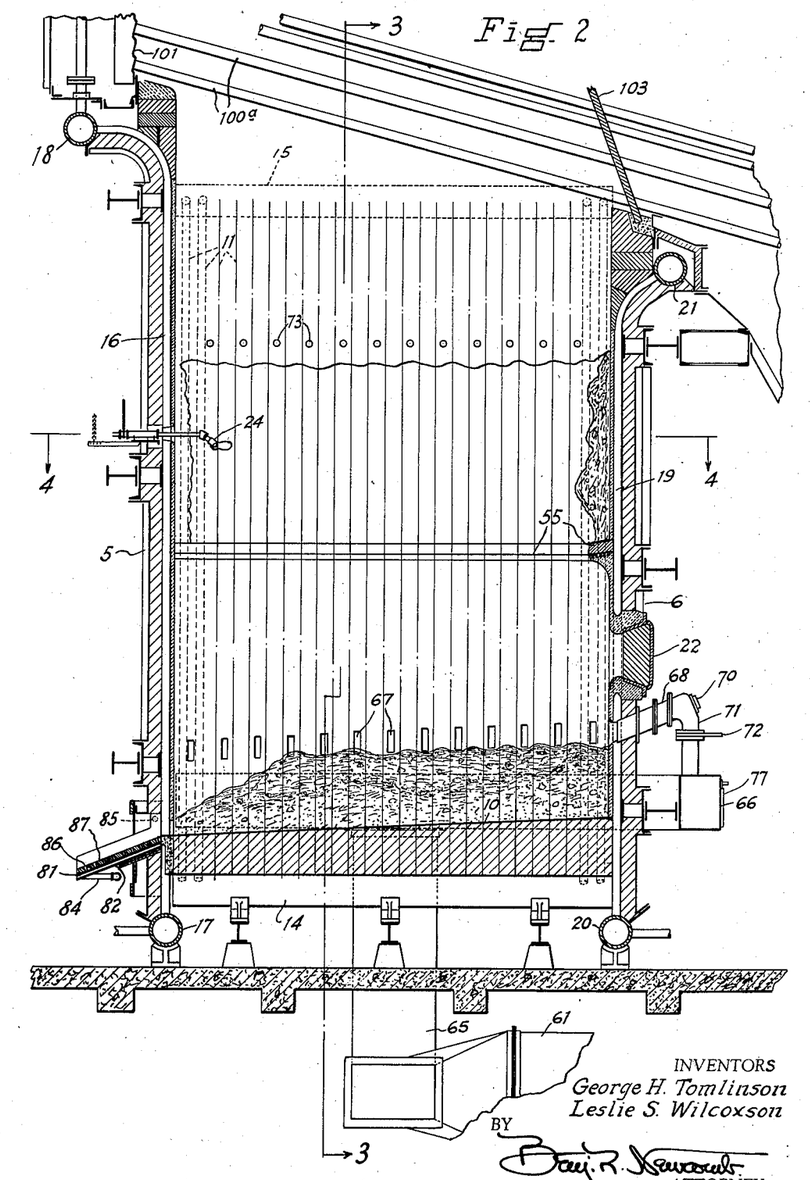
Fig. 2 is an enlarged view of the recovery furnace shown in Fig. 1.
Figure 3:
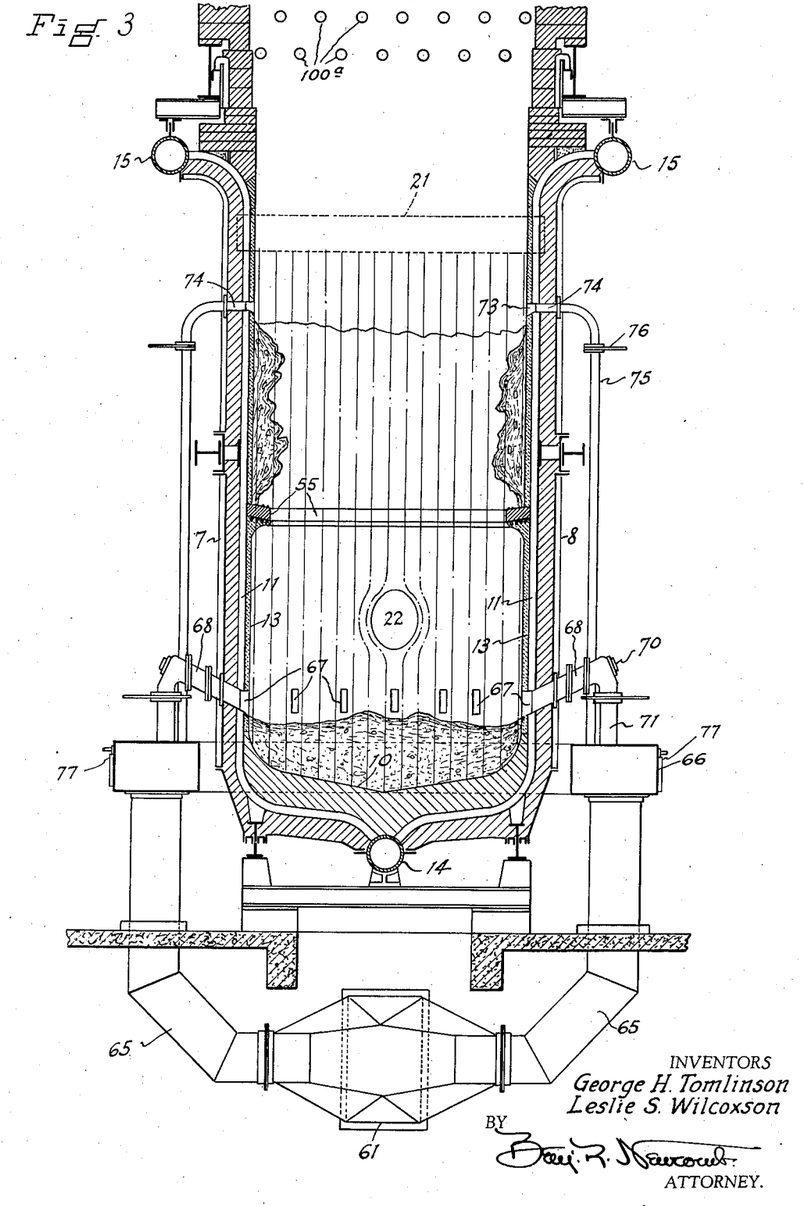
Fig. 3 is a vertical transverse section taken on the line 3—3 of Fig. 2.

The char separating from the wall masses falls on the hearth at the bottom of the furnace in a pile of varying depth, as indicated in Figs. 2 and 3. Primary combustion air, preheated if desirable, is supplied in a multiplicity of downwardly directed streams against the char on the hearth for the burning of the combustible portion of the char collected thereon, and the dry porous condition of the char and presence of substantially all of its original organic content facilitates its ignition and burning. The amount of primary air supplied is desirably no more than sufficient to make up the theoretical oxygen requirements for the combustion of the char on the hearth. Under these conditions, a reducing atmosphere can be easily maintained throughout most of the bed. Of the heat generated in the lower section, a small percentage is used for the liquefaction of the chemicals included in the char and to support the reducing reaction by which the sodium sulphate is reduced to sodium sulphide ($Na_2S$). The liquefied chemicals are continuously withdrawn from the hearth and passed into a dissolving tank for return ultimately to the digestors, while the products of combustion flow upwardly into the upper section of the furnace into contact with the char on the walls and the discharging spray particles. The relatively flat coarse spray employed provides an effective liquid screen across the furnace for removing dust particles from the ascending gases and returning them eventually to the hearth. A relatively small amount of secondary air, preheated if desirable, is supplied to the upper section of the furnace above the spray level to consume any combustible volatiles distilled off from the char masses on the furnace walls and any unburned combustible gases escaping from the lower section. The combustibles in the liquor are thus fully utilized and the heat thus generated increases the sensible heat in the gases passing out of the upper end of the recovery furnace.

On leaving the recovery furnace the sensible heat of the products of combustion is further utilized in a heat transfer apparatus, preferably in a steam boiler. On leaving the steam boiler or other heat recovery device, the products of combustion are preferably passed to an evaporating device wherein much of the remaining sensible heat is used for partly evaporating weak liquor and dust particles in suspension in the gases are washed out and eventually returned to the recovery furnace with the liquor. The gases on leaving the evaporating device will be at a relatively low temperature indicating an effective recovery of the heat in the gases. The chemicals lost during the pulping process and the relatively small amount lost in the recovery process are made up by the addition of salt cake ($Na_2SO_4$) to the black liquor before its entry into the recovery furnace. The described self-sustaining process has been found to permit the burning of nearly a ton of 55% solids-liquor per day per square foot of furnace cross-sectional area with a chemical recovery of approximately 95% and an overall thermal efficiency of 91.4%. Stable furnace conditions over varying load conditions are easily maintained in operation by suitably regulating the liquor and air supplies and the distribution of the char on the furnace walls.

Figure 1:
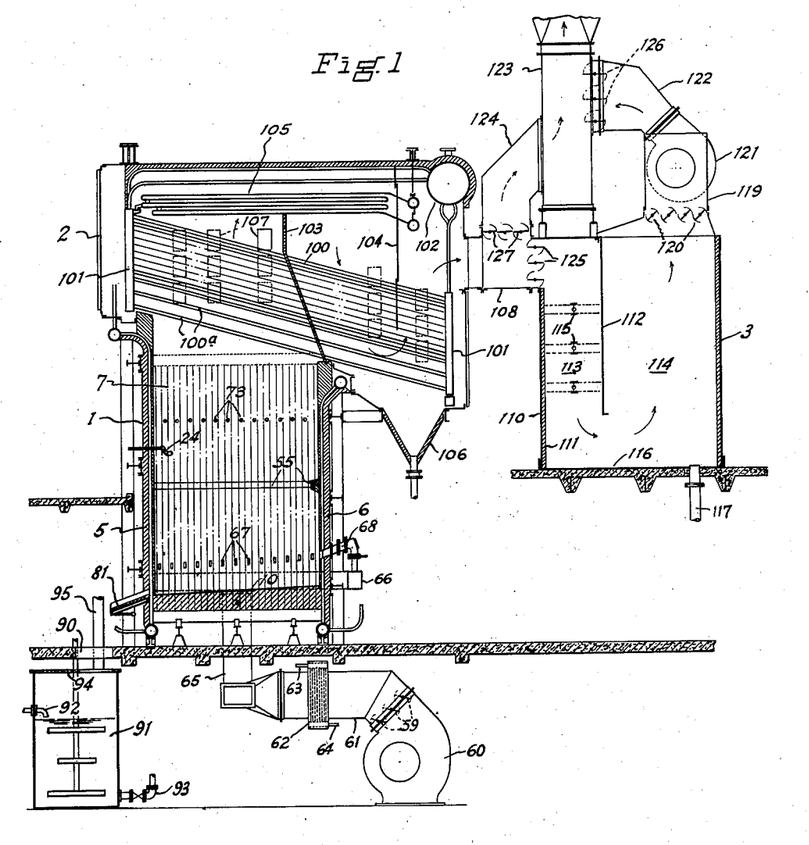
Fig. 1 is a sectional elevation of a recovery unit constructed in accordance with our invention.

In Figs. 1-16 of the drawings we have illustrated a preferred form of recovery unit for carrying out the process heretofore described. The main elements of the recovery unit are a vertical recovery furnace 1, a steam boiler 2, and a spray tower 3, relatively arranged as shown in Fig. 1.

The recovery furnace illustrated is defined by vertical boundary walls, including a front wall 5, rear wall 6, and side walls 7 and 8 respectively, each of which is preferably formed with an inner layer of plastic refractory, wall cooling provisions and one or more outer layers of heat insulating material, enclosed by a steel casing and held in position by suitable steel structural members, as indicated in the drawings. The bottom of the furnace is formed by a trough-shaped inclined fluid cooled refractory hearth 10. The upper end of the recovery furnace is open throughout its entire area to provide a gas exit to the superposed steam boiler 2.

Figures 8, 9, 10:
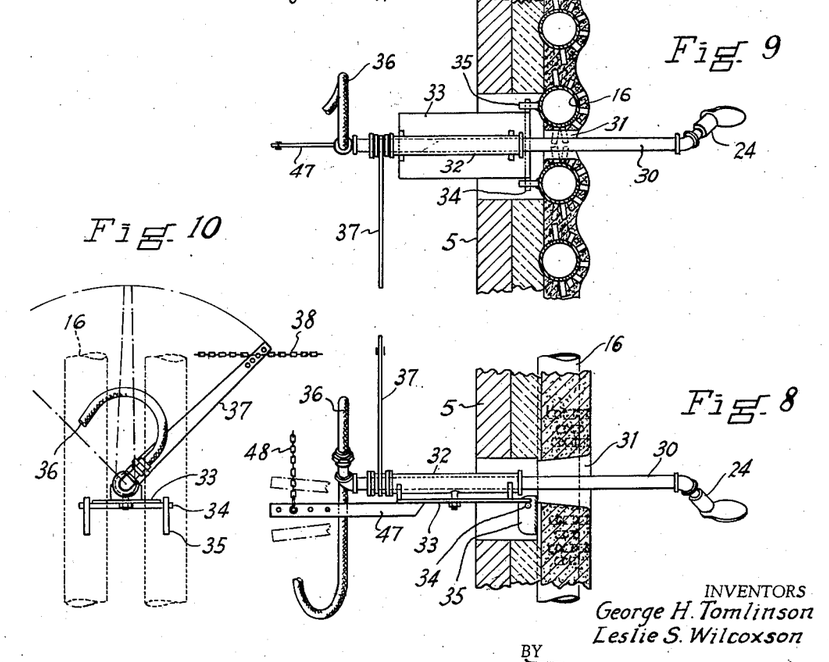
Fig. 8 is a vertical section through the front furnace wall illustrating the mounting of the spray nozzle.
Figs. 9 and 10 are plan and end views respectively of the parts shown in Fig. 8.
Figure 14:
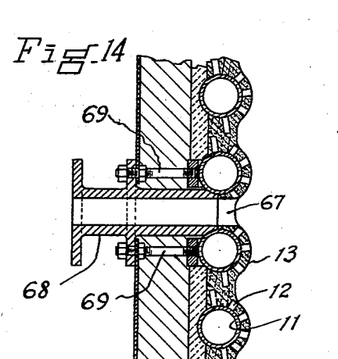
Fig. 14 is a horizontal section through one of the primary air nozzles.
Figure 15:
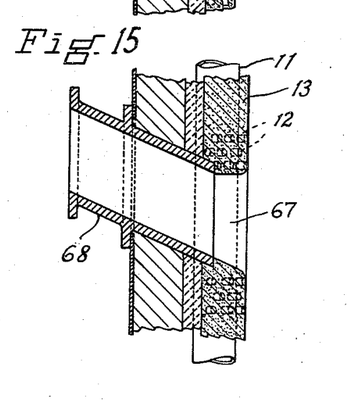
Fig. 15 is a vertical section through the air nozzle of Fig. 14.

More specifically and as shown most clearly in Figs. 3, 14 and 15, the side walls 7 and 8 are each provided with a row of horizontally spaced vertical water tubes 11 having a multiplicity of stud projections 12 thereon substantially throughout their vertical extent for supporting an inner layer of plastic chrome ore refractory 13. The lower ends of both rows of tubes 11 are bent inwardly intermediate the hearth structure and connected to a common longitudinally extending inlet header 14. The upper ends of each row of tubes 11 are bent outwardly and connected to a longitudinally extending outlet header 15. The headers 14 and 15 are suitably connected into the boiler circulation system to provide an upward fluid flow through the tubes 11. As shown in Figs. 2, 8 and 9, the front wall 5 is similarly provided with a row of horizontally spaced vertical refractory-supporting stud tubes 16 having their lower ends connected to a transverse inlet header 17 below the hearth, and their upper ends bent outwardly into a transverse outlet header 18, the headers 17 and 18 being also connected into the boiler circulation system. The rear wall 6 is similarly provided with a row of refractory-supporting stud tubes 19 connected to a lower transverse inlet header 20 and an upper transverse outlet header 21, both of which are connected into the boiler circulation system. Some of the tubes 19 are bent laterally to permit the incorporation of an access door 22 in the rear wall. A furnace of rectangular cross-section is thus defined with the side walls of greater length than the front and rear walls.

Figure 4:
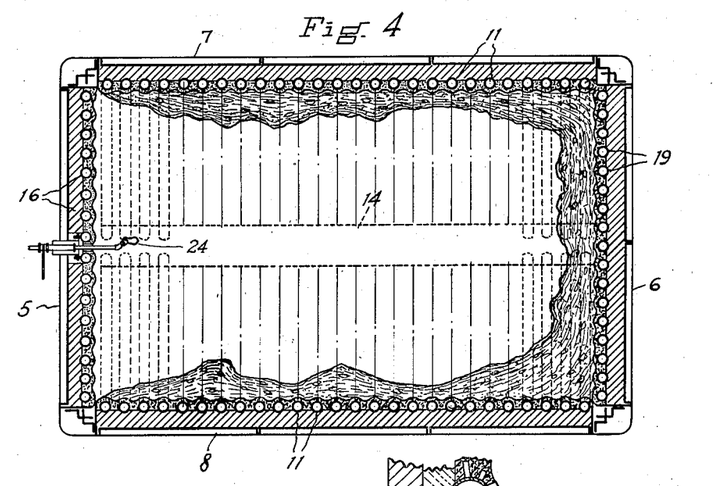
Fig. 4 is a horizontal section taken on the line 4—4 of Fig. 2.
Figures 5, 6, 7, 13:
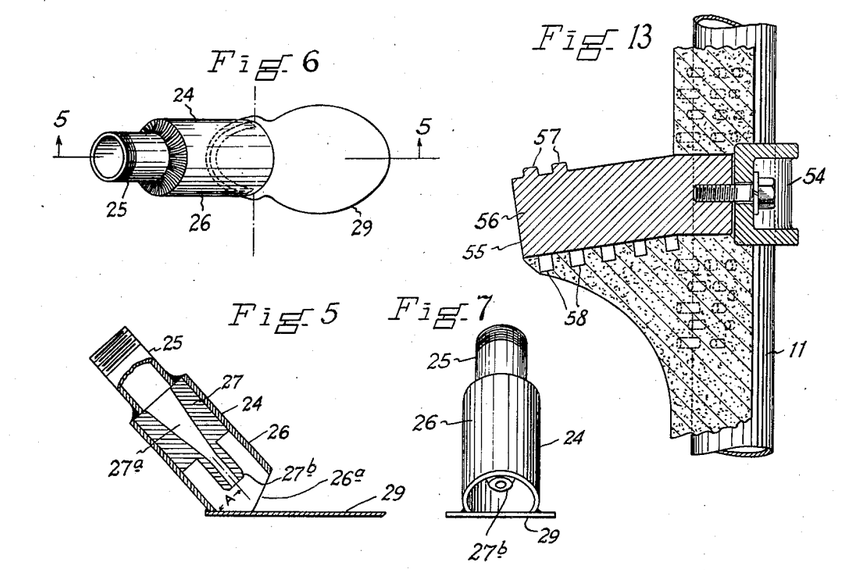
Fig. 5 is a sectional elevation of the spray nozzle taken on the line 5—5 of Fig. 6.
Figs. 6 and 7 are plan and end views of the spray nozzle.
Fig. 13 is a vertical section through one of the ledge blocks.

In accordance with our invention, the concentrated black liquor is sprayed into the furnace from a point adjacent the front wall 5, and the rear wall 6 and side walls 7 and 8 act as arresting surfaces receiving the impact of the spray particles. As shown in Figs. 5, 6 and 7, the spray provisions for introducing the black liquor comprise a spray nozzle 24 formed by a nipple 25 through which the black liquor enters, an inclined tubular hood member 26 welded thereto and surrounding a nozzle plug 27 formed with a tapering discharge passage 27ᵃ. The lower end of the plug 27 is cut away to form a central projecting nozzle 27ᵇ within the hood and through which the liquor discharges against a flat substantially oval impact plate 29 arranged at a predetermined angle A to the axis of discharge of the nozzle 27ᵇ. The angle A will be varied for different furnace proportions and changes in the desired distribution of the liquor. With the furnace shown, an angle A of approximately 48° has been found to provide a substantially uniform spray impact per unit area on the rear and side walls. The lower end of the hood 26 is cut away at 26ᵃ, as shown in Fig. 5, to confine the spray discharged to approximately 180°, so that with the spray nozzle positioned at the front end of the furnace the spray will be discharged toward and impact on the rear wall 6 throughout its width and on the side walls 7 and 8 substantially throughout their length, forming masses of char thereon of irregular contour, as indicated in Figs. 2-4, while the front wall will be clear.

The spray nozzle 24 is advantageously mounted so as to permit continuous predetermined oscillating movements thereof to shift the area of impact of the spray particles on the rear and side walls. Suitable provisions for this purpose are illustrated in Figs. 8-12, and include a horizontally arranged liquor supply pipe 30 extending through a vertically elongated port 31 in the front wall 5, and on the inner end of which the spray nozzle 24 is mounted. The pipe 30 is rotatably mounted at its outer end in a sleeve 32 carried by a plate 33 pivotally mounted for movements about a transverse horizontal axis by means of a pivot pin 34 at its inner end journaled in lugs 35 carried by adjacent stud tubes 16. The outer end of the pipe 30 is connected to a flexible black liquor supply connection 36. With this form of mounting, the pipe 30 can be oscillated in a vertical plane about the pivot pin 34 and about its own axis.

Figure 11:
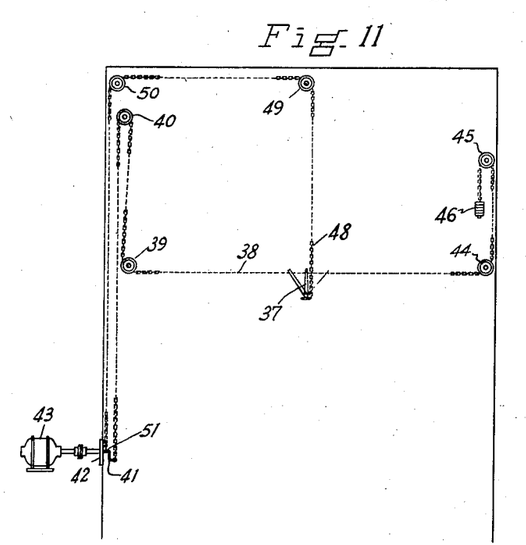
Fig. 11 is a somewhat diagrammatic elevation of the spray nozzle operating mechanism.
Figure 12:
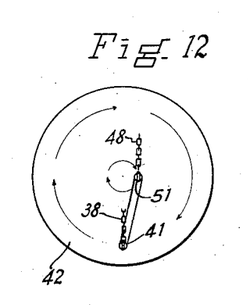
Fig. 12 is a front view of the crank disc.

With the pipe 30 horizontal and the spray nozzle plate 29 also in a horizontal position, the spray would impact on the side walls 7 and 8 along an area increasing and curving downwardly towards the rear wall, and on the rear wall along a rectangular area corresponding to the limits of the area of impact at the rear end of the side walls due to the increasing distance the spray particles must travel in a furnace of the cross-section illustrated. Most of the spray would be concentrated in transit in a relatively small height, with a small percentage of generally finer particles traveling at the upper and lower sides thereof. If the spray nozzle were continuously maintained in this horizontal position the impact of the spray particles on the rear and side walls along a relatively restricted area would limit the amount of material that could be treated in a furnace of the proportions illustrated without the material flowing down the walls in an excessively wet condition. To provide a more extended area of deposit on the side and rear walls while maintaining the desirable flat coarse spray and rendering the material as deposited more exposed to the furnace temperature conditions, mechanism is provided for continuously oscillating the spray nozzle vertically and about the axis of the pipe 30. As shown in Figs. 8 to 12, the outer end of the pipe 30 has secured thereon a lever arm 37, to the upper portion of which an operating chain or the like 38 is adjustably connected. As shown in Fig. 11, the chain 38 is given a horizontal oscillating movement by passing it around pulleys 39 and 40 and connecting it to a crank pin 41 mounted on a crank disc 42 rotated by an electric motor 43. The opposite end of the chain 38 is passed around pulleys 44 and 45 and supports a suitable counterweight 46. The angle of throw of the lever arm 37 may be varied by shifting the point of connection of the chain 38 thereto to thereby change the effective radius of the lever and/or by varying the radius of the crank pin 41 on the disc 42, as indicated in Fig. 12. The described parts are preferably proportioned so that the spray nozzle plate 29 will be tilted about 45° in both directions, so that when tilted the spray will impact at different levels on the side walls 7 and 8.

If the pipe 30 were maintained in the horizontal position and continuously oscillated about its axis, the spray would cover an area of generally butterfly form on the rear wall, with an excessively wet area at the axis. To provide a more uniform distribution of the spray deposits over a greater area on the rear wall, the spray nozzle is desirably given an oscillating movement in a vertical plane. The mechanism for this purpose consists of an arm 47 secured to the rear end of the plate 33 and having an operating chain or the like 48 adjustably connected thereto for raising the arm and thereby the plate 33 about the pivot pin 34. As shown in Fig. 11, the chain 48 passes upwardly around pulleys 49 and 50 and is connected at its lower end to a crank pin 51 on the disc 42. The desired range of movement of the arm 47 being less than that of the lever 37, the pin 51 is made shorter than the pin 41 and positioned closer to the axis of the disc 42. With this arrangement the arm 47 will be periodically raised to the upper position indicated in Fig. 8, and returned to the lower position by gravity due to the greater weight of parts at the outer side of the pivot pin. The range of vertical oscillations can be varied by shifting the point of connection of the chain 48 to the arm 47 and/or by changing the radius of the crank pin 51 on the disc 42.

The movements of the chains 38 and 48 are advantageously synchronized so that the nozzle plate 29 will not be tilted relative to its longitudinal axis when in its extreme upper and lower positions and progressively tilted to its opposite extreme positions when the pipe 30 is horizontal. This synchronization can be effected simply by connecting the chains to the common driving disc 42 and spacing the crank pins 51 and 41 at a 90° angle thereon, as shown in Fig. 12. The spray nozzle and nozzle oscillating mechanism disclosed herein are being claimed per se and in combination in an application of Leslie S. Wilcoxson and Frederick G. Ely, Serial No. 23,406, filed May 25, 1935.

The side and rear walls of the recovery furnace are provided at their inner sides with an outwardly inclined ledge 55 adjacent the lower level of the char. The ledge is formed by a continuous series of inclined metallic blocks 56 supported on and held in heat transfer contact with the wall tubes, as shown in Fig. 13, by tube clamps 54. The upper surface of the blocks 56 is formed with projections 57 to aid in retaining the deposited material in position on the walls. The lower surface of the blocks 56 is provided with studs 58 to hold an extended portion of the wall refractory 13 in contact with the underside of the blocks. With the described ledge block arrangement, char dropping from the side and rear walls will be deflected inwardly away from the walls, thus preventing erosion of the wall refractory in the lower section and clogging of the primary air ports hereinafter described.

The air required for combustion is preferably supplied to the recovery furnace at two levels therein, primary air being introduced through the side and rear walls adjacent the hearth and secondary air through the side walls above the level of the char. Provisions for this purpose consist of a forced draft fan 60 delivering air to a discharge conduit 61, the discharge being controlled by a series of dampers 59. A steam-air tubular heater 62, having a steam supply connection 63 and a drain connection 64, is located in the conduit 61 for preheating the air when desired. The air is delivered to branch conduits 65 leading to opposite portions of a wind box 66 surrounding the rear and sides of the furnace adjacent the hearth. Vertically elongated primary air ports 67 are formed in the side and rear walls of the furnace between the corresponding wall tubes and at a level adjacent to the desired upper level of the bed of char to be normally present on the hearth 10. The ports 67 in the side walls are arranged in a row parallel to the surface of the hearth, as shown in Figs. 1 and 2. A downwardly directed primary air nozzle 68 is mounted in each of the primary air ports with its lower inner end terminating at the center line of the corresponding tube row. The inner ends of air nozzles 68 are held in heat transfer contact with adjacent wall tubes, as shown in Figs. 14 and 15, by connecting bolts 69 between flanges on the nozzles and lugs secured to the tubes. Each of the air nozzles 68 is provided with a peep hole 70 and separately connected by a conduit 71, controlled by an adjustable orifice plate 72, to the wind box 66. With this arrangement, the bed of char on the hearth will be penetrated by downwardly impinging streams of air on three sides, providing suitable conditions for rapid combustion of the combustible portion of the char.

Secondary air ports 73 of smaller flow area than the primary ports are formed in the two side walls 7 and 8 slightly above the upper level of the char and through which secondary air nozzles 74 discharge substantially horizontal streams of air sweeping across the furnace creating turbulent conditions in that section promoting combustion of any combustible gases present. The secondary air nozzles are separately connected to the wind box 66 by vertical pipes 75 controlled by adjustable orifice plates 76. Doors 77 are provided along the wind box for natural draft operation.

Figure 16:
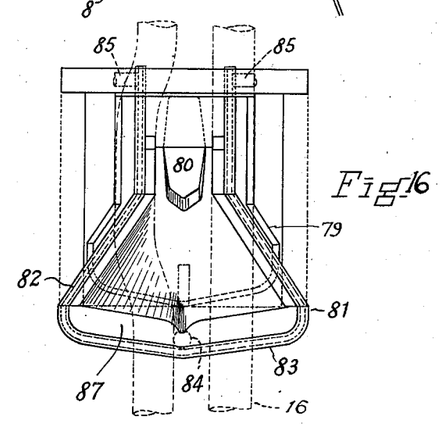
Fig. 16 is an outer end view of the smelt spout.

In normal operation the chemicals in the char collecting on the hearth will fuse and flow downwardly through the bed in contact with the exceedingly porous and reactive carbonaceous material which effects an endothermic reducing action converting the sodium sulphate to sodium sulphide. The liquefied chemicals flow downwardly along the hearth towards the front wall 5. As shown in Figs. 1, 2 and 16, the front wall is formed with a tap hole 80 between adjacent water tubes 16 and into which extends an outwardly flaring spout 81, the inner end of the spout being supported by a saddle 79 and held against the adjacent wall tubes. The spout 81 is formed with hollow sides 82 and a V-shaped hollow bottom 83 through which a cooling fluid flows from an inlet connection 84 to outlet connections 85. The upper side of the spout bottom is provided with studs 86 for supporting a layer of chrome ore refractory 87. As indicated in Fig. 1, the smelt discharging through the spout drops through an opening 90 in the floor into a dissolving tank 91 where it is dissolved in weak green liquor entering the tank through a pipe 92 and the solution withdrawn at a predetermined concentration or density through a pipe 93. The dissolving tank 91 has a loose cover 94 and an atmospheric vent pipe 95 for the discharge of the steam and other gases generated in the tank by the addition of the molten smelt.

With the recovery furnace constructed as shown and described, the furnace is started up by employing an auxiliary fuel, such as wood and/or oil, and heated to a relatively high temperature before introducing the black liquor. The black liquor together with the salt cake added is the delivered to the spray nozzle and discharged against the side and rear walls to form the successive layers of char thereon. The lumps of char separating from the walls drop into the lower section of the furnace onto the hearth where the combustible organic content is burned and the inorganic solids fused. The products of combustion from the lower section ascend in the furnace past and in contact with the deposited char and through the spray stream. In the upper section, the secondary air introduced effects the combustion of any unburned gases in the ascending stream including any combustible volatiles distilled from the char on the walls. The products of combustion at a temperature normally around 1700° F. pass out of the upper end of the recovery furnace into the associated steam boiler.

As shown in Fig. 1, the steam boiler illustrated is of the Babcock & Wilcox type having a horizontally inclined tube bank 100, the lower rows 100ᵃ of which and the tubes therein are suitably spaced to form a slag screen for the remaining rows. Headers 101 are arranged at opposite ends of the tube bank and connected by circulators to a steam and water drum 102. Baffles 103 and 104 are positioned to provide a multi-pass flow of the gases across the tube bank. A steam superheater 105 may be installed above the tube bank, as conventionally illustrated. A dust hopper 106 is located below the second and third passes of the boiler. Lancing doors 107 are formed in opposite side walls of the boiler adjacent the tube bank to facilitate cleaning of the tubes therein. An outlet conduit 108 forms a gas connection between the boiler third pass and the spray tower 3.

The spray tower 3 is formed by a steel casing 110 of rectangular form lined at its inner side with vitrified brick 111. A transverse metal baffle 112 extends downwardly from the top of the spray tower to a point short of the bottom and divides the spray tower into a relatively narrow downflow pass 113 and a relatively wide upflow pass 114. A series of vertically spaced spray nozzles 115 are located in the downflow pass 113 and arranged to deliver sprays of weak black liquor across the flow area of the pass. The boiler gases pass downwardly through the pass 113 in intimate contact with the successive spray streams whereby dust particles in suspension are washed out and the weak liquor absorbs sufficient heat from the gases to effect the evaporation of large amounts of moisture and thereby increase the density of the weak liquor. The gases pass downwardly around the lower end of the baffle 112 and enter the low velocity up-pass 114, the abrupt change in direction and the substantial decrease in velocity at this point due to the substantial drop in temperature of the gases and increased flow area of the passage tending to further separate liquor and dust in suspension. The bottom of the spray tower is formed by a steel plate 116 across which the liquor flows to an outlet pipe 117, advantageously located at the rear end of the spray tower and extending slightly above the bottom plate 116 to provide a thin layer of liquor on the bottom plate for minimizing corrosion thereof. The outlet pipe 117 is connected to one or more evaporators (not shown), preferably of the multiple effect type utilizing steam generated in the boiler, and in which the weak liquor is further concentrated to the desired density and subsequently delivered to the recovery furnace.

The gases leave the spray tower through an outlet connection 119 controlled by a series of dampers 120 at the upper end of the pass 114 and leading to an induced draft fan 121. The fan discharges through an outlet conduit 122 into a stack connection 123.

Under certain conditions of operation it may be necessary or desirable to close off the spray tower and pass the gases directly to the stack connection 123 under natural draft. For such conditions a by-pass conduit 124 is provided between the outlet conduit 108 and the stack connection 123. Cut-off dampers 125 and 126 at the inlet end of the spray tower and outlet end of the fan discharge conduit 122 respectively can be closed to close off the spray tower. When the by-pass 124 is to be used cut-off dampers 127 at the inlet end of the by-pass are opened. Combustion air may be admitted directly to the wind box through the doors 77 when the forced draft fan 60 is out of service.

Figure 17:
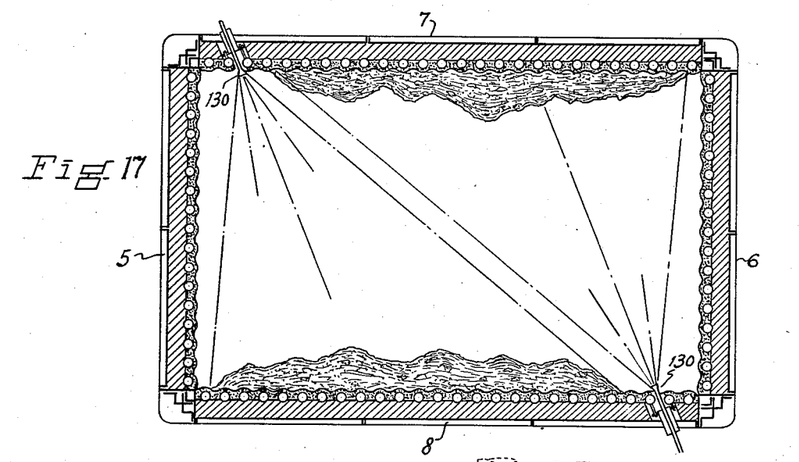
Fig. 17 is a view similar to Fig. 4 illustrating a modified spray arrangement.

In Fig. 17 we have illustrated a modified arrangement of the spray provisions for a recovery furnace of the character described in which two spray nozzles 130 are employed and mounted in the side walls 7 and 8 at opposite ends thereof. The nozzles 130 are formed and arranged to discharge flat coarse sprays mainly through the cross-sectional areas indicated by the broken lines against the opposite side wall. The spray nozzles 130 are preferably mounted to permit only vertical oscillations thereof, the nozzle mounting and operating mechanism being similar to that shown for the same purpose in Figs. 8–12.

While in accordance with the provisions of the statutes we have illustrated and described herein the best forms of our invention now known to us, those skilled in the art will understand that changes may be made in the process and in the form of the apparatus disclosed without departing from the spirit of the invention covered by our claims, and that certain features of our invention may sometimes be used to advantage without a corresponding use of other features.

We claim:

1. A process of recovering chemicals and heat in a vertical recovery furnace from liquor containing inorganic chemicals and combustible organic matter which comprises introducing the liquor in a relatively flat spray directed across the furnace and of a character such that a major portion of the spray particles impact on and adhere to a vertical arresting surface exposed to the temperature conditions in the furnace after passing through and being heated by an ascending stream of high temperature gases sufficiently to put the spray particles when impacting in a sticky condition, and continuously oscillating the spray vertically to deposit the spray particles in successive layers on the arresting surface.

2. A process of recovering chemicals and heat in a vertical recovery furnace from liquor containing inorganic chemicals and combustible organic matter which comprises introducing the liquor in a relatively flat spray directed across the furnace and of a character such that a major portion of the spray particles impact on and adhere to a vertical arresting surface exposed to the temperature conditions in the furnace after passing through and being heated by an ascending stream of high temperature gases sufficiently to put the spray particles when impacting in a sticky condition, and continuously oscillating the spray about its axis of discharge to deposit the spray particles on the arresting surface over a substantial area.

3. A process of recovering chemicals and heat in a vertical recovery furnace from liquor containing inorganic chemicals and combustible organic matter which comprises introducing the liquor in a relatively flat spray directed across the furnace and formed of spray particles of a size and at a velocity such that a major portion of the spray particles impact on and adhere to a vertical arresting surface exposed to the temperature conditions in the furnace after passing through and being heated by an ascending stream of high temperature gases sufficiently to put the spray particles when impacting in a sticky condition, and continuously oscillating the spray vertically and about its axis of discharge to deposit the spray particles on the arresting surface in successive layers.

4. A process of recovering chemicals and heat in a vertical recovery furnace from liquor containing inorganic chemicals and combustible organic matter which comprises introducing the liquor in a spray directed across the upper section of the furnace and formed of spray particles of a size and at a velocity such that a major portion of the spray particles impact on a vertical arresting surface exposed to the temperature conditions in the upper section of the furnace after passing through and being heated by an ascending stream of high temperature gases sufficiently to put the spray particles when impacting in a sticky condition, continuously varying the direction of the spray to deposit the spray particles on the arresting surface in an adhering mass of successive layers from which portions separate by gravity, collecting the separated material in the lower section of the furnace, supplying air to the furnace for the combustion of the combustible portion of the separated material, utilizing a portion of the heat generated in the lower section of the furnace for the liquefaction therein of the included chemicals, and utilizing the high temperature gases of combustion from the lower section of the furnace for treating liquor subsequently introduced into the upper section of the furnace.

5. A process of recovering chemicals and heat in a vertical recovery furnace from liquor containing inorganic chemicals and combustible organic matter which comprises introducing the liquor in a relatively flat spray directed across substantially the entire cross-sectional area of the upper section of the furnace and formed of spray particles of a size and at a velocity such that a major portion of the spray particles impact on a vertical arresting surface exposed to the temperature conditions in the upper section of the furnace after passing through and being heated by an ascending stream of high temperature gases sufficiently to put the spray particles when impacting in a sticky condition, continuously oscillating the spray vertically and about its axis of discharge to deposit the spray particles on the arresting surface in an adhering mass of successive layers from which lumps of substantially dry porous material separate by gravity, collecting the lumps of separated material in the lower section of the furnace, supplying air mainly to the lower section of the furnace for the combustion of the combustible portion of the material collected therein without the addition of auxiliary fuel, utilizing a portion of the heat generated in the lower section of the furnace for the liquefaction therein of the included chemicals, utilizing the high temperature gases of combustion from the lower section of the furnace for treating liquor subsequently introduced into the upper section of the furnace, withdrawing the high temperature gases from the upper section of the furnace above the level of the spray, and withdrawing the included chemicals in a liquefied condition from the lower section of the furnace.

6. A process of recovering chemicals and heat in a vertical recovery furnace from liquor containing inorganic chemicals and combustible organic matter which comprises introducing the liquor in a spray directed across the upper section of the furnace and formed of spray particles of a size and at a velocity such that spray particles impact on a substantially vertical arresting surface exposed to the temperature conditions in the upper section of the furnace after passing through and being heated by an ascending stream of high temperature gases sufficiently to put the spray particles when impacting in condition to coalesce on the arresting surface in an adhering mass and be retained thereon until in a substantially dehydrated porous condition, collecting the material separating from said mass by gravity in the lower section of the furnace, supplying primary air to the lower section of the furnace for the combustion of the combustible portion of the material collected therein, utilizing a portion of the heat generated in the lower section of the furnace for the liquefaction therein of the included chemicals, utilizing the gaseous products of combustion from the lower section of the furnace for treating liquor subsequently introduced into the upper section of the furnace, supplying secondary air to the upper section of the furnace above the spray level therein for the combustion of combustible gases in the upper section, withdrawing the products of combustion from the upper section of the furnace above the level of the spray, and withdrawing included chemicals in a liquefied condition from the lower section of the furnace.

7. A self-sustaining process of recovering chemicals and heat in a vertical recovery furnace from sulphate paper pulp liquor containing inorganic chemicals and combustible organic matter which comprises introducing the liquor in a relatively flat spray directed across the upper section of the furnace and formed of spray particles of a size and at a velocity such that a major portion of the spray particles impact on a substantially vertical arresting surface exposed to the temperature conditions in the upper section of the furnace after passing through and being heated by an ascending stream of high temperature gases sufficiently to put the spray particles when impacting in condition to coalesce on the arresting surface in an adhering mass and be retained thereon until in a substantially dehydrated porous condition but without substantial change in its initial organic content, collecting the material separating from said mass by gravity in the lower section of the furnace, supplying primary air to the lower section of the furnace for the combustion of the combustible portion of the material collected therein without the addition to the furnace of other combustible matter, utilizing a portion of the heat generated in the lower section of the furnace for the liquefaction and reduction therein of the included chemicals, utilizing the gaseous products of combustion from the lower section of the furnace for treating liquor subsequently introduced into the upper section of the furnace, supplying secondary air to the upper section of the furnace above the spray level therein for the combustion of combustible gases in the upper section, withdrawing the products of combustion from the upper section of the furnace above the level of the spray, and withdrawing included chemicals in a liquefied condition from the lower section of the furnace.

8. Apparatus for recovering chemicals and heat from liquor containing inorganic chemicals and combustible organic matter comprising vertical walls forming a vertical recovery furnace substantially rectangular in horizontal cross-section, a spray nozzle adjacent one of said walls and constructed and arranged for spraying the liquor substantially horizontally across substantially the entire cross-sectional area of the upper section of the furnace in a single relatively flat spray having spray particles of a size and at a velocity such that a major portion of the spray particles impact on all of the remaining vertical walls of the furnace and coalesce thereon in an adhering mass, a hearth receiving material separating from said adhering mass, means for supplying air to the lower section of said furnace for the combustion of the combustible organic matter therein, said walls being arranged to direct the gaseous products of combustion from the lower section of the furnace into the upper section of the furnace, and an outlet for the gaseous products of combustion from the upper section of the furnace above the spray level therein.

9. Apparatus for recovering chemicals and heat from liquor containing inorganic chemicals and combustible organic matter comprising vertical walls forming a vertical recovery furnace substantially rectangular in horizontal cross-section, means constructed and arranged to spray the liquor through one of said walls across the upper section of the furnace in a relatively flat spray having spray particles of a size and at a velocity such that spray particles impact on at least one of the remaining vertical walls and coalesce thereon in an adhering mass, means for varying the direction of said spray to deposit the spray particles in successive layers on said remaining side wall, a hearth receiving material separating from said adhering mass, means for supplying air to said furnace for the combustion of the combustible organic matter therein, said walls being arranged to direct the gaseous products of combustion from the lower section of the furnace into the upper section of the furnace, an outlet for the gaseous products of combustion from the upper section of the furnace above the spray level therein, and an outlet for the withdrawal of included chemicals in a liquefied condition from the lower section of the furnace.

10. Apparatus for recovering chemicals and heat from liquor containing inorganic chemicals and combustible organic matter comprising vertical walls forming the sides of a vertical recovery furnace, means constructed and arranged to spray the liquor across the upper section of the furnace in intimate contact with gaseous products of combustion from the lower section of the furnace and in a spray having spray particles of a size and at a velocity such that spray particles impact on at least one of said walls and coalesce thereon in an adhering mass, means for continuously oscillating said spray means vertically to deposit the spray particles in successive layers on said wall, a hearth receiving material separating from said adhering mass, primary air ports opening to the lower section of the furnace for the combustion of the combustible portion of the material collected on the hearth, said walls being arranged to direct the gaseous products of combustion from the lower section of the furnace into the upper section of the furnace, secondary air ports opening to the upper section of the furnace above the spray level, and an outlet for the gaseous products of combustion from the upper section of the furnace above the spray level therein.

11. Apparatus for recovering chemicals and heat from liquor containing inorganic chemicals and combustible organic matter comprising walls forming a vertical recovery furnace, means constructed and arranged to spray the liquor across the upper section of the furnace in intimate contact with the gaseous products of combustion from the lower section of the furnace and in a spray having spray particles of a size and at a velocity such that spray particles impact on at least one of said walls and coalesce thereon in an adhering mass, means for continuously oscillating said spray means about its axis of discharge to deposit the spray particles in successive layers on said wall, a hearth receiving material separating from said adhering mass, primary air ports opening to the lower section of the furnace for the combustion of the combustible portion of the material collected on the hearth, said walls being arranged to direct the gaseous products of combustion from the lower section of the furnace into the upper section of the furnace, secondary air ports opening to the upper section of the furnace above the spray level, and an outlet for the gaseous products of combustion from the upper section of the furnace above the spray level therein.

12. Apparatus for recovering chemicals and heat from liquor containing inorganic chemicals and combustible organic matter comprising walls forming a vertical recovery furnace, means adjacent one of said walls constructed and arranged to spray the liquor across the upper section of the furnace in intimate contact with gaseous products of combustion from the lower section of the furnace and in a relatively flat spray having spray particles of a size and at a velocity such that spray particles impact on the remaining side walls and coalesce thereon in an adhering mass, means for continuously oscillating said spray means vertically and about its axis of discharge to deposit the spray particles in successive layers on said remaining side walls, a hearth receiving material separating from said adhering mass, primary air ports opening to the lower section of the furnace for the combustion of the combustible portion of the material collected on the hearth, said walls being arranged to direct the gaseous products of combustion from the lower section of the furnace into the upper section of the furnace, secondary air ports opening to the upper section of the furnace above the spray level, an outlet for the gaseous products of combustion from the upper section of the furnace above the spray level therein, and an outlet for the withdrawal of included chemicals in a liquefied condition from the lower section of the furnace.

13. Apparatus for recovering chemicals and heat from liquor containing inorganic chemicals and combustible organic matter comprising vertical walls forming a vertical recovery furnace substantially rectangular in horizontal cross-section, means for spraying the liquor through one of said walls across the upper section of the furnace in intimate contact with gaseous products of combustion from the lower section of the furnace and in a relatively flat spray having spray particles of a size and at a velocity such that a major portion of the spray particles impact on the remaining side walls and coalesce thereon in an adhering mass, means for continuously oscillating the spray means vertically and about its axis of discharge to deposit the spray particles in successive layers on said remaining side walls, a hearth receiving material separating from said adhering mass, primary air ports opening to the lower section of the furnace for the combustion of the combustible portion of the material collected on the hearth, said walls being arranged to direct the gaseous products of combustion from the lower section of the furnace into the upper section of the furnace, secondary air ports opening to the upper section of the furnace above the spray level, an outlet for the gaseous products of combustion from the upper section of the furnace above the spray level therein, and an outlet for the withdrawal of included chemicals in a liquefied condition from the lower section of the furnace.

14. Apparatus for recovering chemicals and heat from liquor containing inorganic chemicals and combustible organic matter comprising vertical walls forming a vertical recovery furnace, means forming an inwardly projecting ledge at the furnace side of and intermediate the height of one of said vertical walls, means for spraying the liquor across the upper section of the furnace in intimate contact with gaseous products of combustion from the lower section of the furnace and in a spray having spray particles of a size and at a velocity such that spray particles impact on at least said last mentioned vertical wall above said ledge and coalesce thereon in an adhering mass, a hearth receiving material separating from said adhering mass, means for supplying air to said furnace for the combustion of the combustible organic matter therein, said walls being arranged to direct the gaseous products of combustion from the lower section of the furnace into the upper section of the furnace, and an outlet for the gaseous products of combustion from the upper section of the furnace above the spray level therein.

15. Apparatus for recovering chemicals and heat from liquor containing inorganic chemicals and combustible organic matter comprising refractory faced vertical side walls forming a vertical recovery furnace, means constructed and arranged to spray the liquor across the upper section of the furnace in intimate contact with gaseous products of combustion from the lower section of the furnace and in a spray having spray particles of a size and at a velocity such that spray particles impact on at least one of the side walls of the furnace and coalesce thereon in an adhering mass, a hearth receiving material separating from said adhering mass, a row of wall cooling tubes extending upwardly from said hearth to a level above said spray means and in cooling relation with the portion of the side wall receiving the spray impact, air ports for supplying air to said furnace for the combustion of the combustible organic matter therein, said side walls being arranged to direct the gaseous products of combustion from the lower section of the furnace into the upper section of the furnace, an outlet for the gaseous products of combustion from the upper section of the furnace above the spray level therein, and an outlet for the withdrawal of included chemicals in a liquefied condition from the lower section of the furnace.

16. Apparatus for recovering chemicals and heat from liquor containing inorganic chemicals and combustible organic matter comprising refractory faced vertical side walls forming a vertical recovery furnace, means for spraying the liquor across the upper section of the furnace in a spray having spray particles of a size and at a velocity such that spray particles impact on at least one of the side walls of the furnace and coalesce thereon in an adhering mass, a hearth receiving substantially dry material separating from said adhering mass, wall cooling tubes extending upwardly from said hearth to a level above said spray means and in cooling relation with said side walls, projections on said cooling tubes arranged to support refractory material at the inner side thereof, air ports between said cooling tubes for supplying air to said furnace for the combustion of the combustible organic matter therein, said side walls being arranged to direct the gaseous products of combustion from the lower section of the furnace into the upper section of the furnace, an outlet for the gaseous products of combustion from the upper section of the furnace above the spray level therein, a steam boiler receiving the products of combustion from said outlet, conduits connecting said wall cooling tubes into the boiler circulation system, and an outlet between said cooling tubes for the withdrawal of included chemicals in a liquefied condition from the lower section of the furnace.

17. A process of treating paper pulp residual liquor which comprises introducing the liquor into a vertical recovery furnace in a spray directed across the upper section of the furnace and depositing in an adhering mass on a vertically disposed wall surface after passing through and being heated by an ascending stream of high temperature gases, varying the direction of the spray to cause the spray particles to deposit on the wall surface over an extended area, supplying air to the furnace for the combustion of dehydrated material separating from said mass and collecting in the lower section of the furnace, and withdrawing the high temperature gases generated from the upper section of the furnace after contacting with liquor being sprayed across the upper section of the furnace.

18. A process of treating paper pulp residual liquor which comprises introducing the liquor into a vertical recovery furnace in a spray directed across the upper section of the furnace and depositing in an adhering mass on a vertically disposed wall surface after passing through and being heated by an ascending stream of high temperature gases, varying the direction of the spray to cause the spray particles to deposit on the wall surface in successive layers and from which mass dehydrated portions separate and collect in the lower section of the furnace, supplying air to the furnace for the combustion of the separated material, and withdrawing the high temperature gases generated from the upper section to the furnace after contacting with liquor being sprayed across the upper section of the furnace.

19. A process of treating paper pulp residual liquor which comprises introducing the liquor into a vertical recovery furnace in a spray directed across the upper section of the furnace and formed of spray particles of a size and at a velocity such that a major portion of the spray particles impact on a vertically disposed wall surface of the furnace after passing through and being heated by an ascending stream of high temperature gases sufficiently to put the spray particles when impacting in a sticky condition, varying the directing of the spray to cause the spray particles to deposit in an adhering mass over an extended wall area and from which mass dehydrated portions separate and collect in the lower section of the furnace, supplying air to the furnace for the combustion of the separated material, and withdrawing the high temperature gases generated from the upper section of the furnace after contacting with liquor being sprayed across the upper section of the furnace.

20. A process of treating paper pulp residual liquor which comprises introducing the liquor into a vertical recovery furnace in a spray directed across the upper section of the furnace and formed of spray particles of a size and at a velocity such that a major portion of the spray particles impact on a vertically disposed wall surface in the upper section of the furnace after passing through and being heated by an ascending stream of high temperature gases sufficiently to put the spray particles when impacting in a sticky condition, continuously varying the direction of the spray to cause the spray particles to deposit on the wall surface over an extended area in an adhering mass of successive layers and from which mass dehydrated portions separate and fall into the lower section of the furnace, supplying air to the lower section of the furnace for the combustion therein of the combustible portion of the separated material, and withdrawing the lower section temperature gases generated in the lower section of the furnace from the upper section of the furnace after contacting with liquor being sprayed across the upper section of the furnace.

21. A furnace comprising walls forming a vertically elongated chamber, nozzle means constructed and arranged to spray a combustible liquor across the upper section of said chamber in a relatively flat spray towards a vertically disposed wall surface and so as to deposit thereon in an adhering mass, mechanism for varying the position of said nozzle means to shift the area of impact of said spray on said wall surface, a refractory hearth forming the bottom of said chamber and arranged to receive by gravity dehydrated combustible material separating from said wall surface, primary air ports opening to the lower section of said chamber, said chamber-forming walls being arranged to direct any high temperature gases generated in the lower section through the spray in the upper section of said chamber, secondary air ports opening to the upper section of said chamber adjacent the spray level therein, and a gas outlet in the upper section of said chamber above the spray level therein.

22. A furnace comprising vertically disposed walls forming a chamber substantially rectangular in horizontal cross-section, nozzle means for spraying a combustible liquor through one of said walls across the upper section of said chamber in a relatively flat spray directed towards and so as to deposit on at least one of the remaining vertical walls in an adhering mass, mechanism for varying the position of said nozzle means to shift the area of impact of said spray on said wall, a refractory hearth forming the bottom of said chamber and arranged to receive by gravity dehydrated combustible material separating from said remaining wall, primary air ports opening to the lower section of said chamber, said vertically disposed walls being arranged to direct any high temperature gases generated in the lower section through the spray in the upper section of said chamber, secondary air ports opening to the upper section of said chamber above the spray level therein, and a gas outlet in the upper section of said chamber above the spray level therein.

23. A furnace comprising opposite pairs of vertical walls arranged to define a chamber of rectangular horizontal cross-section, a trough-shaped inclined refractory hearth forming the bottom of said chamber, means for discharging a combustible liquid into the upper portion of said chamber, an outlet in the upper portion of said chamber for gaseous products of combustion, rows of cooling tubes extending upwardly from below the upper and lower ends of said hearth to a level above said liquid discharge means and in cooling relation with the corresponding side walls, transverse headers connected to the lower ends of said tube rows, conduit means supplying a cooling fluid to said headers and tube rows, a header below said hearth and arranged in vertical alignment with the longitudinal center line thereof, rows of cooling tubes having curved lower end portions connected to said last named header extending upwardly to a level above said liquid discharge means and in cooling relation with said hearth and remaining side walls, and conduit means supplying a cooling fluid to said last named header and tube rows.

24. A furnace comprising opposite pairs of vertical walls arranged to define a chamber of rectangular horizontal cross-section, a hearth forming the bottom of said chamber, means for introducing a combustible liquid into the upper portion of said chamber, an outlet in the upper portion of said chamber for gaseous products of combustion, rows of cooling tubes extending upwardly from said hearth in cooling relation with a pair of opposite side walls, transverse headers connected to the lower ends of said tube rows, conduit means supplying a cooling fluid to said headers, a header below said hearth and extending longitudinally thereof in vertical alignment with the longitudinal center line thereof, rows of cooling tubes having their lower ends connected to said last named header and extending upwardly in cooling relation with said hearth and remaining side walls, and conduit means supplying a cooling fluid to said last named header and tube rows.

25. A process of treating paper pulp residual liquor which comprises introducing the liquor into a recovery furnace in a spray directed across the upper section of the furnace and formed of spray particles of a character such that a major portion of the spray particles impact on an arresting surface in the upper section of the furnace after passing through and being heated by an ascending stream of high temperature gases sufficiently to put the spray particles when impacting in a sticky condition and to cause spray particles to deposit on the arresting surface in an adhering mass from which dehydrated portions separate and are burned in the lower section of the furnace, withdrawing the high temperature gases generated in the lower section of the furnace from the upper section of the furnace after contacting with liquor being sprayed across the upper section of the furnace, and varying the path of travel of the spray across the upper section of the furnace to shift the area of spray deposition on the arresting surface.

26. Apparatus for recovering chemicals and heat from liquor containing inorganic chemicals and combustible organic matter comprising a vertical recovery furnace having a vertically disposed arresting surface in the upper part thereof exposed to the temperature conditions therein, spray nozzle means constructed and arranged to spray the liquor across the upper part of said furnace towards said arresting surface in a spray of a character such that a major portion of the spray particles impact on and adhere to said arresting surface, a hearth arranged to receive dehydrated material separating from said arresting surface, means for supplying air to said furnace above said hearth for burning the combustible material collecting thereon, and means for varying the direction of the spray discharged to shift the area of spray deposition on said arresting surface.

27. Apparatus for recovering chemicals and heat from liquor containing inorganic chemicals and combustible organic matter comprising a vertical recovery furnace having a substantially vertical arresting surface in the upper part thereof exposed to the temperature conditions therein, spray nozzle means constructed and arranged to spray the liquor across the upper part of said furnace towards said arresting surface in a spray having spray particles of a size and at a velocity such that a major portion of the spray particles impact on and adhere to said arresting surface, a hearth arranged to receive dehydrated material separating from said arresting surface, means for supplying air to said furnace above said hearth for burning the combustible material collecting thereon, and means for continuously varying the direction of the spray discharged to deposit the spray particles in successive layers on said arresting surface.

28. A furnace for the recovery of heat and chemicals comprising vertically disposed walls defining a furnace chamber, means opening into the upper portion of said furnace chamber for introducing therein material containing inorganic chemicals and combustible organic matter, a hearth defining the bottom of said furnace chamber, means forming an outlet for molten chemicals collecting on said hearth, means adjacent said hearth for introducing air for the combustion of organic matter depositing on said hearth, and said furnace chamber walls comprising fluid conduit means having a multiplicity of metallic studs projecting inwardly from the furnace chamber side thereof, and a layer of plastic chrome ore refractory molded around said studs and over the furnace chamber side of said fluid conduit means and forming a temperature and alkaline-resistant refractory lining for said furnace chamber walls.

GEORGE H. TOMLINSON.
LESLIE S. WILCOXSON.